United States Patent [19]

Huber

[11] Patent Number: 5,446,995
[45] Date of Patent: Sep. 5, 1995

[54] MODULAR DRAINAGE SYSTEM FOR CONTAINERS

[76] Inventor: Keith R. Huber, 16582 Ross La., Huntington Beach, Calif. 92647

[21] Appl. No.: 310,153

[22] Filed: Sep. 21, 1994

[51] Int. Cl.⁶ .............................................. A01G 9/02
[52] U.S. Cl. ......................................... 47/86; 220/23.4
[58] Field of Search ........................... 47/86; 52/584.1; 220/23.4

[56] References Cited

U.S. PATENT DOCUMENTS

| | | | |
|---|---|---|---|
| 2,810,171 | 10/1957 | Brooks et al. | 220/23.4 |
| 2,815,855 | 12/1957 | Fisher | 220/23.4 |
| 2,838,818 | 6/1958 | Brennan | 220/23.4 |
| 3,002,612 | 10/1961 | Poupitch | 220/23.4 |
| 3,146,505 | 9/1964 | Hansen | 220/23.4 |

FOREIGN PATENT DOCUMENTS 1293690 4/1968 Germany ........................... 220/23.4

*Primary Examiner*—Ramon S. Britts
*Assistant Examiner*—Joanne C. Downs
*Attorney, Agent, or Firm*—Macro-Search Corp.; Gene Scott

[57] ABSTRACT

The present invention relates to a portable modular drainage system that is attached to a series of cylindrical planting containers. The system comprises a plurality of peaked modules with opposing, convergent curved side walls designed to conform to the curve of a planting container. Between each side wall is a notch which accepts one or more containers and firmly connects the module to the containers. The modules are preferably designed in four distinct shapes, one with quadrature symmetry for connecting four containers at once, one smaller triangular unit which connects three staggered containers, one three-legged unit that connects two containers which are positioned at an edge of a plant farm, and one edge unit designed to connect three staggered containers at the end of three rows. When these modules are appropriately connected to the containers, they effectively drain the water that would otherwise have fallen between the pots directly into the pots. Not only does this system save up to 20% of water that would otherwise be lost between containers but it also prevents unwanted weed and grass growth between the containers by depriving it of water, and helps to prevent the containers from being blown over.

11 Claims, 2 Drawing Sheets

5,446,995

MODULAR DRAINAGE SYSTEM FOR CONTAINERS

FIELD OF THE INVENTION

This invention relates to drainage systems for potted plants. More specifically, this invention relates to a system of removable modules that are easily attached to rows of potted plants in order to catch water that would otherwise fall between the plants and direct it into the pots, thus preventing considerable water waste when irrigating large numbers of plants.

BACKGROUND OF THE INVENTION

The present invention relates to efficiently growing potted plants in nurseries. In particular this invention relates to connecting a multitude of potted plants together in order to save large quantities of water when watering the plants. It also relates to saving money by reducing the amount of herbicides, plastic sheeting and other expensive measures that are normally needed to stop weeds from growing between pots.

The expression "container" is used to encompass the various types of planters in which plants may be grown whether they be called "pots", "planters", "containers", etc. and whether they are formed by terra cotta, clay, concrete, plastic, wood or other materials. While shapes of planting containers may vary, the present invention deals only with circular containers of various sizes.

Commercial nurseries must water a multitude of potted plants. To do this most efficiently, all the pots are normally grouped together and watered at once with an overhead watering system. Although this is quite expedient, it results in great amounts of lost water when round potters are used. In fact, about 20% of all the water falls in between and outside of the pots. This water promotes weed growth on the soil between the containers. Thus, the savings that accrue by this expedient watering method are then lost in the costs of combating the resulting weeds with herbicides or plastic sheeting placed underneath the pots.

Thereafter, inventors have created types of clips to keep the pots together during watering as well as irrigation systems that feed water directly into the pots.

In plant nurseries where it is common practice to plant and grow yearlings and plants in pots, it is common for the potted plants to be blown over in high winds. This is particularly the case with regard to palm trees which have a large leaf area ratio to pot size and weight of the plant and pot. When pots are blown over, not only does it damage the plants, but it is also a time-consuming procedure to right the pots and ensure that the amount of soil in the pot is still sufficient.

The prior art has proposed a number of devices for pots, pot covers and irrigation systems. Heretofore, such devices have either involved complex mechanisms in order to achieve their desired results or have been cumbersome to use and maintain. Even though these innovations may be suitable for the specific individual purposes to which they address, they differ from the present invention as hereinafter contrasted.

U.S. Pat. No. 5,220,745 for the Drip Irrigation Apparatus for Pots and Planters to John B. Elliott and John S. DeCell comprises a drip irrigation apparatus for a container holding soil and a plant. The apparatus includes a through access opening, preferably in the side of the container. A length of tubing extends from outside to inside the opening and an outside female adapter is secured on opposite ends of the length of tubing by threaded connections or by bonding. The adapters have larger diameters than the opening and a washer is placed on the length of tubing so that the opening is sealed against loss of soil. The inside and outside adapters each have an inside fitting that extends inwardly and outwardly in order to direct water to irrigate inside the containers. The inside flexible tubing at one end connects to the outside flexible tubing which connects to a water source at the other end. A male adapter can be substituted for one female adapter and the length of tubing.

This prior an patent differs from the present invention in that the prior art requires the use of special pots. Although this is acceptable for home or private use, commercial nurseries would have to continually re-pot the plants or sell these expensive special pots. If the consumer was not going to use the irrigation system, the gardener would also need a means for capping off the system. The time involved in connecting and disconnecting this irrigation system to the pots every time a new pot is brought in or sold is also very costly.

U.S. Pat. No. 5,184,421 for Locking Cover Pots to Stephen W. Meharg provides a pot which covers the dirt in a container and locks to the container to prevent scattering of the dirt or access by children or pets. The pot cover is a disk that is normally flat. The disk is split so it can be overlapped to cause the disk to become conical. The cover has water holes to allow adequate moistening of the soil. There is a hole in the cover for the stem of the plant, and the area surrounding the hole has easily removable rings to allow expansion of the hole. A skirt is attached to the cover, the skirt being adapted to be fixed to the pot. In one form, the skirt locks firmly around the perimeter of the pot. In another form, tabs on the skirt engage a lip of the pot.

The present invention is for watering pots in a commercial nursery whereas the prior an is for aid in growing plants in the residence. The cover is used to prevent spillage of the soil from the pot when accidentally knocked over or when the plant is watered. The present invention is not concerned with soil spillage, only with loss of water while watering the plant.

U.S. Pat. No. 5,157,869 for the Compound Separable Plant Pot to James D. Minton comprises a peripherally defined, truncated conic pot that provides two releasable, interconnected portions that are maintained by a cup-like bottom element. The interconnected pot portions each define substantially diametrical halves of the pot. They are joined by an overlapping seam which has complementary nubbin and indentation structures to aid releasable fastening. The adjacent surfaces of the pot and fastening cup have complementary nubbin and indentation fasteners to aid releasable fastening and positional maintenance of these elements. The pot structure is particularly adapted for formation by injection molding from plastic materials.

In the above prior art invention, the operator uses the invention in order to re-pot the plant from the pot it is currently in to one of a larger size with a minimum shock to the plant. The new invention is not concerned with changing pots, only with the most efficient means of watering them.

In U.S. Pat. No. 5,056,198, Dean P. Viglione introduces the Planter Clip which is used to secure a plurality of potted plants together in order to prevent the pots from tipping over in high winds. The planter clip comprises an elongate middle section having a clip on both ends. The clips are secured to the top rims of the pots and one clip is used to secure two adjacent pots together in a spaced arrangement. It is possible to secure a plurality of pots in a spaced grid pattern by using a plurality of such clips.

The Viglione patent, as with the other patents referenced above, has no means in which to reduce the amount of water wasted while watering the potted plants. This prior art connects the pots by the use of clips thereby stopping the pots from being blown over due to wind or during watering but water still falls between the pots causing waste.

SUMMARY OF THE INVENTION

The present invention is for the purpose of providing a simple means for water to drain into the pots in which plants and flowers are placed, instead of falling on the ground around and between the pots. The invention is most useful for a plant farm that places a large number of potted plants in adjacent rows and columns and which provides a sprinkler system for watering all the plants.

The portable modular drainage system comprises a number of various units including one having quadrature symmetry, an inner triangular unit, a three-legged unit and an edge unit, all of which attach to the lips of circular plant containers. The quad unit and the three-legged unit are all that is necessary if the pots are placed in a rectangular grid of rows and columns. If the pots are staggered, one row offset with respect to the next, then the inner triangular unit, the three-legged unit and the edge unit are all used to cover the various openings between the pots and along the edge of the rows and columns.

All units have a small upraised edge so that water is directed into the pots. This also gives the unit added strength. The units can be made out of 1/32 inch thick, or less, plastic sheet material. The ridges that run along the edges of the surfaces provide added strength to each unit. Alternately, the top surfaces may be rounded, again for strength. By simply connecting the pots together in either a rectangular grid or an offset grid the pots are provided added resistance to being blown over.

If undergrowth between pots is to be eliminated, the units are made of opaque material. If the blockage of sunlight into the pots (around the edges) is to be minimized, the units may be made of translucent or transparent materials.

Accordingly, the portable modular drainage system provides a simple method of watering planted pots and not the ground between them. This system is easy to attach and detach from the pots. It is an object of the present invention to provide an easy way for the user to be able to water a multitude of potted plants without wasting up to 20% of the water used. More particularly, it is an object of the present invention to provide a simple means to guide water that would normally be lost between the pots, directly into the pots. A further object of the present invention is to provide a means to reduce or eliminate the need for extensive herbicides or plastic sheeting underneath the potted plants for prevention of undergrowth.

Still another object of the present invention is to provide a reliable, portable drainage system which is easily attached and detached to conventional or standard sizes and types of round pots. A still further object of the present invention is to provide a means to link the multitude of potted plants together in order to help prevent the pots from being blown over during high winds or due to the pressure of the water spray while watering.

In keeping with these objects, and with others which will become apparent hereinafter, one feature of the present invention resides, briefly stated, in the peaked top surface that directs the sprayed water back into the pots. In accordance with another feature of the present invention, the small upraised edge directs the water back into the pots. A further feature of the present invention is an inherent additional strength of the units by having the upraised edge or coping around the edges.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

DETAILED DESCRIPTION OF THE PREFERRED EMBODIMENT

Figure 3:
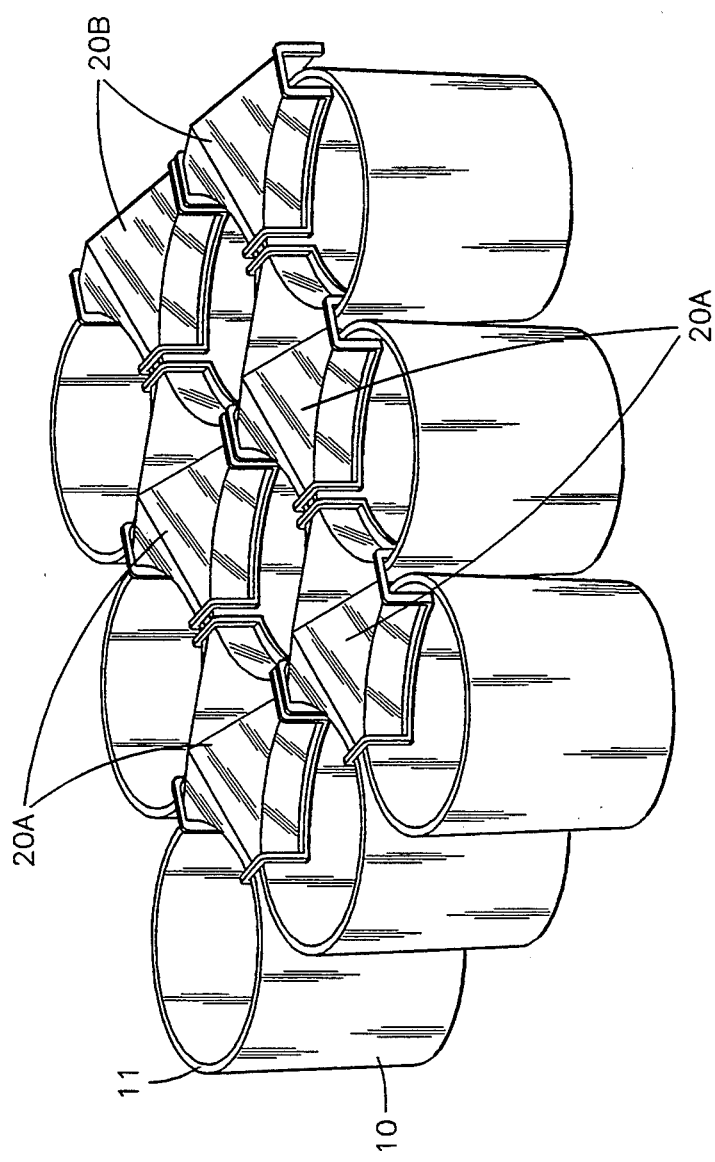
FIG. 3 is a perspective view of the drainage system, namely quadrature units and the three-legged units, attached to rows of vertically aligned containers.
Figure 6:
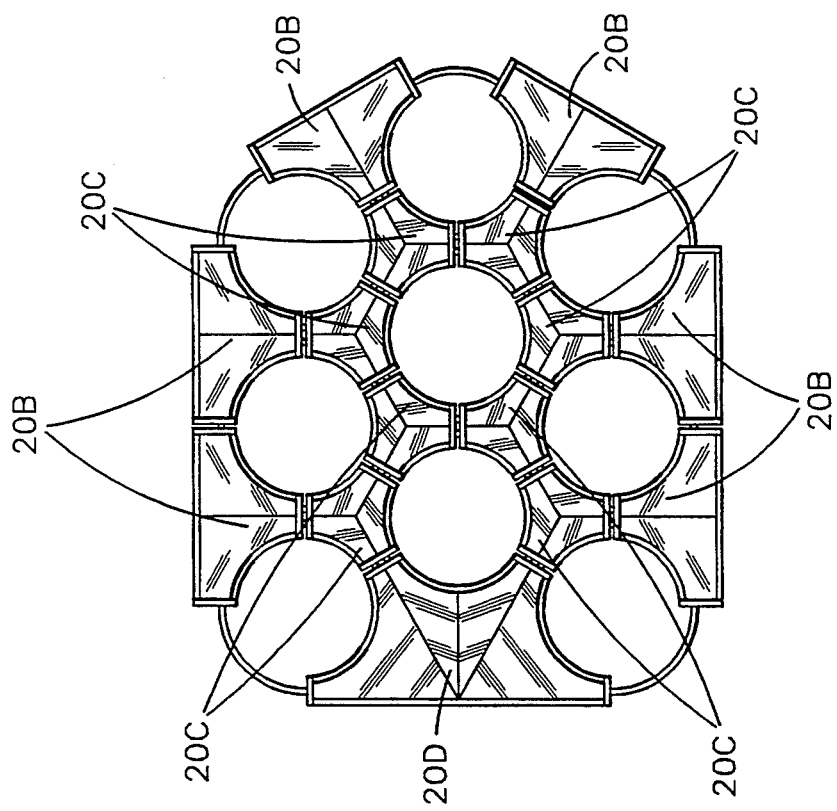
FIG. 6 is a plan view of the drainage system attached to a staggered configuration of containers by using the edge unit, the triangular unit and the three-legged unit.

The present invention is a modular drainage system for use with a network of plant containers 10, as shown in FIGS. 3 and 6. Each of the plant containers 10 has an upfacing circular rim 11, and each circular rim 11 is positioned adjacent to at least one other circular rim 11, either in direct alignment as in FIG. 3, or in a staggered pattern as shown in FIG. 6.

The drainage system is composed of a multitude of drainage modules 20A–D of four different shapes, and other shapes and combinations could be easily created which would be similar to these four in constructional features and operation. Each drainage module 20A–D includes at least one upfacing surface 21 preferably positioned as low as possible to the rim 11 of the containers 10 so as not to block sunshine into the containers 10 or water directed at a low angle. Several approximately vertical side walls 22A and 22B extend downwardly from the upfacing surface 21. Each module 20A–D, contains at least two opposing, convergent, curved side walls 22A, and modules 20B and 20D also have a planar side wall 22B. The side walls 22A conform and connect to the container rims 11 by being layed into the containers 10 and engaging the rim 11.

Each of the side walls 22A and 22B provide two peripheral side edges 23 and a peripheral bottom edge 24. The side and bottom edges 23, 24 are to be understood as the terminal edge of the sides and bottoms of the walls per se, and not the ridges 26 described below. Thus, each pair of adjacent side walls 22A and 22B has two side edges 23 positioned in spaced apart relationship, which form a notch 25 between the side walls 22. These notches 25 are designed to accept at least one of the circular rims 11 of the plant containers 10 such as along an outer edge of plant farm, but are wide enough to accept two of the container rims 11 such as when straddling adjacent container rims 11. Thus, with the drainage modules 20A-D firmly secured onto the circular rims 11, each module 20A-D conducts water run-off into the containers 10 instead of permitting it to fall onto the ground between and around the containers 10.

To further assist in the water conservation, the upfacing surface 21 of each module 20A-D would be convex, preferably of a pyramid structure, although domed, rounded, conical or any other hybrid of these configurations would also be acceptable. This convex nature of the upfacing surface 21 is formed by a plurality of planar portions arranged in an integral, continuous manner, which serves to allow water to run off the sloped surface 21 and drain into the containers 10.

Preferably, but not necessarily, each module 20A-D would contain an integral continuous ridge 26 extending outwardly from at least one of the side edges 23 for further redirecting water into the plant containers 10. This ridge 26 would preferably extend along each side edge 23 and bottom edge 24 as well as along the edge of each upfacing surface 21 over the notches 25. This feature also provides added strength to the modules.

The drainage system may consist of several varying module configurations to allow for the different methods of arranging the containers 10. When the containers 10 are aligned vertically so that each row of containers 10 lines up directly across from the next, modules 20A and 20B are the necessary attachments. On the other hand, when the rows of containers 10 are staggered so that each row is off-set from the next, modules 20B, 20C and 20D are needed.

Figure 1:
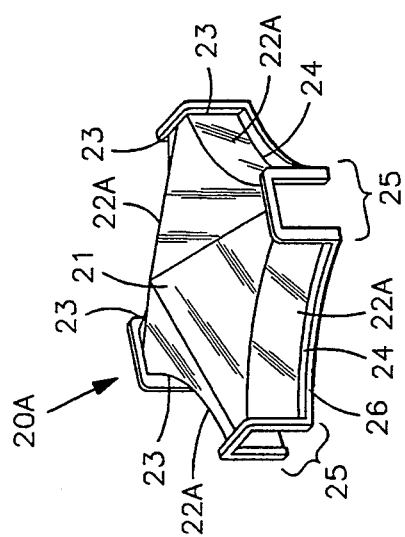
FIG. 1 is a perspective view of the quadrature module, showing its curved, convergent side walls, sloped top surface and notches.
Figure 2:
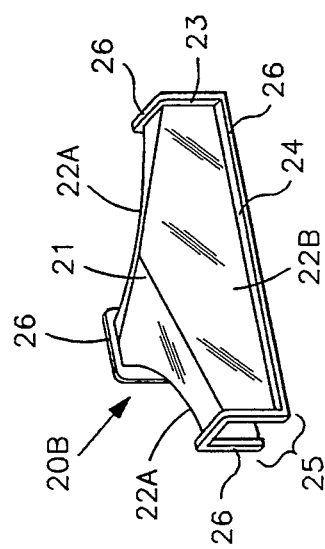
FIG. 2 is a perspective view of the three-legged module, showing the planar side wall and two convergent, curved side walls.

Module 20A (FIG. 1) is essential when the containers 10 are vertically aligned because it is structured to interconnect four adjacent plant containers 10. This is accomplished with two sets of convergent, curved side walls 22A that are arranged in quadrature. Around the edges, when there are only two containers to connect, module 20B is utilized. It is employed to connect the last container 10 of a given row to the last container in the adjacent row. Two opposing convergent curved walls 22A connect to the two adjacent plant containers 10 while a planar wall 22B skirts the outside row of the network of containers 10. This arrangement is demonstrated in FIG. 3.

Figure 4:
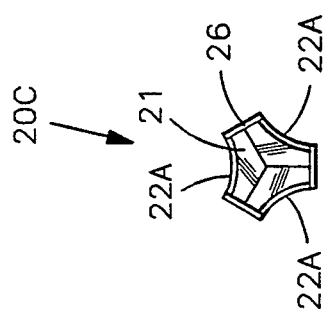
FIG. 4 is a plan view of the triangular unit of the drainage module.
Figure 5:
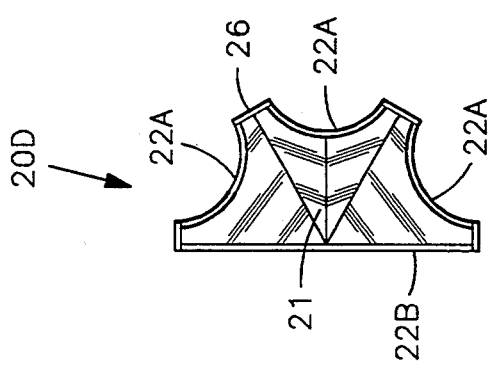
FIG. 5 is a plan view of the edge unit of the drainage module.

When the rows of containers 10 are staggered, module 20C (FIG. 4) replaces module 20A. The side walls of this module 20C include three opposing, convergent curved walls 22A, arranged in a triangular form for interconnecting three adjacent plant containers 10. Module 20D (FIG. 5) is utilized as an edge piece to connect the last three containers in three adjacent rows. This module works when the center container is staggered further inward than the outer two containers. Module 20D is composed of one planar wall 22B and three opposing convergent curved walls 22A. These three curved walls 22A interconnect with the three staggered containers 10, and the planar wall 22B forms a straight edge along the outside of the rows. At the other end of these rows, where the two outer containers 10 are set inward from the center container 10, module 20B is again utilized as an edge piece. The arrangement of these modules 20B, 20C and 20D is demonstrated in FIG. 6.

These modules 20A-D should be created out of a thin-walled, rigid material. In order to prevent weed growth between the containers 10, these modules may be constructed of opaque material. However, in order to provide maximum sun exposure to the contents of the containers 10, the modules may be constructed of transparent or translucent material.

It will be understood that each of the elements described above, or two or more together, may also find a useful application in other types of constructions differing from the type described above. Further, it is clear that the shapes shown are arbitrary in that other shapes and combinations, clusters and other configurations having similar structural elemets and uses may be easily created by those skilled in the art who have knowledge of the instant invention. These alternatives must also be construed as being within the spirit and scope of the present invention by those skilled in the art and that the invention is not limited thereto. Rather, the scope of the invention is to be interpreted only in conjunction with the appended claims.

What is claimed is:

1. A modular drainage system for use with a network of round plant containers, each of the containers having an upfacing circular rim, where each of the circular rims is positioned adjacent to at least one other of the circular rims, the system comprising:

a plurality of drainage modules, each of the modules including at least one continuous and unbroken upfacing surface extending laterally to join integrally with a plurality of near-vertical side walls extending downwardly therefrom, each one of the side walls defined by two peripheral side edges and a peripheral bottom edge, the side walls arranged as a skirt around the at least one upfacing surface with each one of the side walls spaced apart in side-by-side adjacency from each other of the side walls establishing a notch between adjacent said side walls, each said notch accepting at least one of the circular rims of the plant containers for engagement therein, the upfacing surface shaped so that water incident thereon flows downwardly across the side walls and into the containers.

2. The system of claim 1 wherein at least one of the modules has at least one curved side wall in conformance with one of the container rims.

3. The system of claim 1 wherein at least one of the modules has an integral continuous ridge extending outwardly from at least one of the side edges for redirecting water into at least one of said plant containers.

4. The system of claim 3 wherein in at least one of the modules the side walls include two opposing convergent curved walls and a planar wall for interconnecting two adjacent of the plant containers, said plant containers being on an outside row of the network of containers.

5. The system of claim 3 wherein in at least one of the modules the side walls include two sets of convergent curved walls arranged in quadrature for interconnecting four adjacent of the plant containers.

6. The system of claim 3 wherein in at least one of the modules the side walls include three convergent curved walls arranged in a triangular form for interconnecting three adjacent of the plant containers.

7. The system of claim 3 wherein in at least one of the modules the at least one upfacing surface is convex.

8. The system of claim 3 wherein in at least one of the modules the at least one upfacing surface includes a plurality of planar portions arranged in an integral, continuous manner.

9. The system of claim 3 wherein at least one of the modules is constructed of opaque material.

10. The system of claim 3 wherein at least one of the modules is constructed of transparent material.

11. The system of claim 3 wherein the modules are constructed of a thin walled rigid material.

* * * * *